(12) United States Patent
Tanaka et al.

(10) Patent No.: US 7,042,327 B2
(45) Date of Patent: May 9, 2006

(54) ALLOY TYPE THERMAL FUSE AND WIRE MEMBER FOR A THERMAL FUSE ELEMENT

(75) Inventors: Yoshiaki Tanaka, Osaka (JP); Toshiaki Saruwatari, Osaka (JP)

(73) Assignee: Uchihashi Estec Co., Ltd., Osaka (JP)

( * ) Notice: Subject to any disclaimer, the term of this patent is extended or adjusted under 35 U.S.C. 154(b) by 68 days.

(21) Appl. No.: 10/654,042

(22) Filed: Sep. 3, 2003

(65) Prior Publication Data

US 2004/0085178 A1 May 6, 2004

(30) Foreign Application Priority Data

Oct. 30, 2002 (JP) .................... P2002-315174

(51) Int. Cl.
*H01H 85/06* (2006.01)
*H01H 85/11* (2006.01)

(52) U.S. Cl. .............. 337/290; 337/296; 337/160

(58) Field of Classification Search ........... 337/290, 337/296, 295, 297, 159, 160, 416; 29/623; 148/400, 442; 420/559, 561, 562, 577, 589
See application file for complete search history.

(56) References Cited

U.S. PATENT DOCUMENTS

| | | | |
|---|---|---|---|
| 3,201,646 A * | 8/1965 | Mansfield, Jr. ............. 315/239 |
| 3,386,063 A * | 5/1968 | Mansfield, Jr. ............. 337/191 |
| 3,836,883 A * | 9/1974 | Takayasu et al. ........... 337/163 |
| 3,940,728 A * | 2/1976 | Komatsu et al. ............ 337/290 |
| 4,085,396 A * | 4/1978 | Augis et al. ................ 337/290 |
| 4,198,617 A * | 4/1980 | Hara ........................... 337/403 |
| 4,292,617 A * | 9/1981 | McVey ....................... 337/407 |
| 4,622,534 A * | 11/1986 | Bowman ..................... 337/404 |
| 5,252,942 A * | 10/1993 | Gurevich .................... 337/163 |
| 5,631,621 A * | 5/1997 | Nakajima ................... 337/280 |
| 5,712,610 A * | 1/1998 | Takeichi et al. ............ 337/290 |
| 5,833,921 A | 11/1998 | Paruchuri et al. |
| 5,898,357 A * | 4/1999 | Endo et al. ................. 337/159 |
| 5,982,268 A * | 11/1999 | Kawanishi .................. 337/297 |
| 6,064,293 A * | 5/2000 | Jungst et al. ............... 337/290 |
| 6,222,438 B1 * | 4/2001 | Horibe et al. .............. 337/290 |

FOREIGN PATENT DOCUMENTS

| | | |
|---|---|---|
| EP | 0 845 324 A1 | 6/1998 |
| JP | 59-8229 A | 1/1984 |
| JP | 59-8231 A | 1/1984 |
| JP | 3236130 A | 10/1991 |
| JP | 04012428 A * | 1/1992 |
| JP | 6325670 A | 11/1994 |
| JP | 11073869 A | 3/1999 |
| JP | 2001266723 A | 9/2001 |

(Continued)

*Primary Examiner*—Anatoly Vortman
(74) *Attorney, Agent, or Firm*—Akin Gump Strauss Hauer & Feld, LLP (57) ABSTRACT

An alloy type thermal fuse is provided in which a ternary Sn—In—Bi alloy is used, the operating temperature belongs to the range of 130 to 170° C., the overload characteristic and the dielectric breakdown characteristic are excellent, the insulation stability after an operation can be sufficiently ensured, and thinning of a fuse element can be easily realized. A fuse element having an alloy composition in which Sn is larger than 43% and 70% or smaller, In is 0.5% or higher and 10% or lower, and a balance is Bi is used.

44 Claims, 5 Drawing Sheets

FOREIGN PATENT DOCUMENTS

| | | |
|---|---|---|
| JP | 2001266724 A | 9/2001 |
| JP | 20011291459 A | 10/2001 |
| JP | 2001325867 A | 11/2001 |
| JP | 2002025405 A | 1/2002 |
| JP | 2003 041335 A | 2/2003 |
| WO | WO 02/22302 A1 | 3/2002 |

* cited by examiner

ALLOY TYPE THERMAL FUSE AND WIRE MEMBER FOR A THERMAL FUSE ELEMENT

BACKGROUND OF THE INVENTION

1. Field of the Invention

The present invention relates to an alloy type thermal fuse of an operating temperature of about 130 to 170° C., and a wire member for such a thermal fuse element.

2. Description of the Prior Art

An alloy type thermal fuse is widely used as a thermoprotector for an electrical appliance or a circuit element, for example, a semiconductor device, a capacitor, or a resistor.

Such an alloy type thermal fuse has a configuration in which an alloy of a predetermined melting point is used as a fuse element, the fuse element is bonded between a pair of lead conductors, a flux is applied to the fuse element, and the flux-applied fuse element is sealed by an insulator.

The alloy type thermal fuse has the following operation mechanism.

The alloy type thermal fuse is disposed so as to thermally contact an electrical appliance or a circuit element which is to be protected. When the electrical appliance or the circuit element is caused to generate heat by any abnormality, the fuse element alloy of the thermal fuse is melted by the generated heat, and the molten alloy is divided and spheroidized because of the wettability with respect to the lead conductors or electrodes under the coexistence with the activated flux that has already melted. The power supply is finally interrupted as a result of advancement of the division and spheroidization. The temperature of the appliance is lowered by the power supply interruption, and the divided molten alloys are solidified, whereby the non-return cut-off operation is completed. Therefore, the division temperature of the fuse element alloy is set to be substantially equal to the allowable temperature of an electrical appliance or the like.

It is known that an alloy type thermal fuse having the operation mechanism is requested to have the overload characteristic and the dielectric breakdown characteristic.

The overload characteristic means external stability in which, even when a thermal fused operates in increased ambient temperature under the state where a current and a voltage of a given degree are applied to the thermal fuse, the fuse is not damaged or does not generate an arc, a flame, or the like, thereby preventing a dangerous condition from occurring. The dielectric breakdown characteristic means insulation stability in which, even at a given high voltage, a thermal fuse that operates does not cause dielectric breakdown and the insulation can be maintained.

A method of evaluating the overload characteristic and the dielectric breakdown characteristic is specified in IEC (International Electrotechnical Commission) Standard 60691 which is a typical standard, as follows. When, while a rated voltage×1.1 and a rated current×1.1 are applied to a thermal fuse, the temperature is raised at a rate of 2±1 K/min. to cause the thermal fuse to operate, the fuse does not generate an arc, a flame, or the like, thereby preventing a dangerous condition from occurring. After the thermal fuse operates, even when a voltage of (the rated voltage×2+1,000 V) is applied for 1 min. between a metal foil wrapped around the body of the fuse and lead conductors, and, even when a voltage of the rated voltage×2 is applied for 1 min. between the lead conductors, discharge or dielectric breakdown does not occur.

Because of recent increased awareness of environment conservation, the trend to prohibit the use of materials harmful to a living body is growing as a further requirement on an alloy type thermal fuse. Also a fuse element for such a thermal fuse is requested not to contain a harmful material.

Moreover, an alloy type thermal fuse is requested to increase the capacity and reduce the size in order to comply with the enhanced speed, the increased number of functions, and the miniaturization of an electronic device.

As an alloy type thermal fuse in which the operating temperature belongs to the range of about 130 to 170° C., conventionally, known are a fuse of a ternary In—Pb—Sn alloy (for example, Japanese Patent Application Laying-Open Nos. 11-73869, 59-8231, and 3-236130), that of a ternary Sn—Pb—Cd alloy, that of a binary Bi—Sn alloy (for example, Japanese Patent Application Laying-Open No. 2002-25405), and the like.

However, the former two fuses contain metals harmful to the ecological system such as lead and cadmium, and hence are inadequate under the recent strict environmental regulations.

By contrast, a fuse of a binary Bi—Sn alloy has a narrow solid-liquid coexisting region, and contains a large amount of Bi, so that the surface tension of the fuse tends to be high. Therefore, such a fuse has the following overload and dielectric breakdown characteristics. Because of the narrow solid-liquid coexisting region, the alloy during energization and temperature rise may be suddenly changed from the solid phase to the liquid phase, thereby causing an arc to be easily generated immediately after the operation. When an arc is generated, a local and sudden temperature rise occurs. As a result, the flux is vaporized to raise the internal pressure, or the flux is charred. In addition to the above, also the high surface tension causes the molten alloy or the charred flux to be intensely scattered as a result of an energizing operation. Therefore, physical destruction such as generation of cracks due to a local and sudden temperature rise, a rise of the internal pressure, or reconduction between charred flux portions easily occurs during an operation. Moreover, the insulation distance is shortened by the scattered alloy or the charred flux, so that dielectric breakdown is easily caused by reconduction when a voltage is applied after an operation. Furthermore, the alloy structure is slightly weak and has poor ductility. Therefore, the alloy is hardly thinned to, for example, 200 μmϕ, and hence is not meet the requirement of a thinned thermal fuse.

A ternary Sn—In—Bi alloy contains no metal harmful to the ecological system, and hence satisfies environment conservation.

Conventionally, various alloy type thermal fuses in which a ternary Sn—In—Bi alloy is used as a fuse element have been proposed.

For example, known are a fuse which has an alloy composition of 42 to 53% In, 40 to 46% Sn, and 7 to 12% Bi, and in which the operating temperature is 95 to 105° C. (Japanese Patent Application Laying-Open No. 2001-266724), that which has an alloy composition of 55 to 72.5% In, 2.5 to 10% Sn, and 25 to 35% Bi, and in which the operating temperature is 65 to 75° C. (Japanese Patent Application Laying-Open No. 2001-291459), that which has an alloy composition of 51 to 53% In, 42 to 44% Sn, and 4 to 6% Bi, and in which the operating temperature is 107 to 113° C. (Japanese Patent Application Laying-Open No. 59-8229), that which has an alloy composition of 1 to 15% Sn, 20 to 33% Bi, and the balance In, and in which the operating temperature is 75 to 100° C. (Japanese Patent Application Laying-Open No. 2001-325867), and that which has an alloy composition of 0.3 to 1.5% Sn, 51 to 54% In, and the balance Bi, and in which the operating temperature is 86 to 89° C. (Japanese Patent Application Laying-Open No. 6-325670).

However, all the proposed fuses have an operating temperature which is lower than 130° C., and cannot satisfy the requirement that the operating temperature is 130 to 170° C.

Also a fuse which has an alloy composition of 0.5 to 10% In, 33 to 43% Sn, and 47 to 66.5% Bi, and in which the operating temperature is 125 to 135° C. is known (Japanese Patent Application Laying-Open No. 2001-266723). With respect to the range of higher than 135° C. and not higher than 170° C., however, the fuse cannot satisfy the requirement that the operating temperature is 130 to 170° C.

SUMMARY OF THE INVENTION

It is an object of the invention to provide an alloy type thermal fuse in which a ternary Sn—In—Bi alloy is used, the operating temperature belongs to the range of 130 to 170° C., the overload characteristic and the dielectric breakdown characteristic after an operation can be sufficiently ensured, and thinning of a fuse element can be easily realized, and also a wire member for a thermal fuse element.

It is another object of the invention to provide an alloy type thermal fuse in which the capacity can be easily increased by lowering the specific resistance of a fuse element, and also a wire member for a thermal fuse element.

In embodiment 1 of the invention, a wire member for a thermal fuse element has an alloy composition in which Sn is larger than 43% and 70% or smaller, In is 0.5% or higher and 10% or lower, and a balance is Bi.

In embodiment 2 of the invention, a wire member for a thermal fuse element has an alloy composition in which 0.1 to 3.5 weight parts of one, or two or more elements selected from the group consisting of Ag, Au, Cu, Ni, Pd, Pt, Ga, Ge, and P are added to 100 weight parts of the alloy composition.

In embodiment 3 of the invention, in an alloy type thermal fuse, the wire member for a thermal fuse element of embodiment 1 or 2 is used as a fuse element. In embodiment 4 of the invention, the fuse element contains inevitable impurities. In embodiment 5 of the invention, an alloy type thermal fuse has a configuration in which the fuse element is connected between lead conductors, and at least a portion of each of the lead conductors which is bonded to the fuse element is covered with an Sn or Ag film. In embodiment 6 of the invention, an alloy type thermal fuse has a configuration in which lead conductors are bonded to ends of the fuse element, respectively, a flux is applied to the fuse element, the flux-applied fuse element is passed through a cylindrical case, and gaps between ends of the cylindrical case and the lead conductors are sealingly closed, ends of the lead conductors have a disk-like shape, and ends of the fuse element are bonded to front faces of the disk.

In embodiment 7 of the invention, an alloy type thermal fuse has a configuration in which a pair of film electrodes are formed on a substrate by printing conductive paste containing metal particles and a binder, and the fuse element is connected between the film electrodes, and the metal particles are made of a material selected from the group consisting of Ag, Ag—Pd, Ag—Pt, Au, Ni, and Cu.

In embodiment 8 of the invention, a heating element for fusing off the fuse element is additionally disposed in the alloy type thermal fuse.

The wire members for a thermal fuse element of the embodiments are allowed to contain inevitable impurities which are produced in productions of metals of raw materials and also in melting and stirring of the raw materials, and which have an amount that does not substantially affect the characteristics. In the alloy type thermal fuses of the embodiments, a minute amount of a metal material or a metal film material of the lead conductors or the film electrodes is caused to inevitably migrate into the fuse element by solid phase diffusion, and, when the characteristics are not substantially affected, allowed to exist as inevitable impurities.

In embodiment 9 of the invention, a temperature of the fuse element at an operation is lower than a liquidus temperature of a fuse element by 9° C. or more. In an alloy type thermal fuse of embodiment 10 of the invention, an operating temperature belongs to a range of 130 to 170° C., and is lower than a liquidus temperature of a fuse element by 6° C. or more.

According to the wire member for a thermal fuse element of the invention, it is possible to provide an alloy type thermal fuse in which a ternary Sn—In—Bi alloy containing no metal harmful to the ecological system is used, the operating temperature belongs to the range of 130 to 170° C., destruction does not occur even when the fuse is operated under an overload application, and the insulation stability after an operation can be sufficiently ensured. Because of the low specific resistance of the fuse element, the alloy type thermal fuse can be operated at a predetermined operating temperature even under a large load current, and the capacity of the alloy type thermal fuse can be increased. Since the wire member for a thermal fuse element has high drawability, the fuse element can be easily thinned. Therefore, the wire member is suitable for miniaturization and thinning of a thermal fuse.

In embodiment 2, particularly, the drawability of the fuse element can be further improved, and the specific resistance can be further lowered, whereby the miniaturization and thinning of the alloy type thermal fuse can be more enhanced. Even in the case where a thermal fuse is configured by bonding a fuse element to a member which may substantially affect the characteristics, a normal operation can be assured without impairing the function of the fuse element.

In the alloy type thermal fuses of embodiments 9 and 10, since the element temperature at an operation is set to be very lower than the liquidus temperature of the element, the division of the element can be performed in a wide solid-liquid coexisting region, the occurrence of an arc immediately after an operation can be satisfactorily suppressed, a local and sudden temperature rise can be sufficiently prevented from occurring, pressure rise caused by vaporization of the flux due to the temperature rise, and charring of the flux can be suppressed, and the insulation distance can be sufficiently ensured. As a result, also in the case of an alloy other than the ternary Sn—In—Bi alloy, it is possible to assure excellent overload characteristic and dielectric breakdown characteristic after an operation.

DETAILED DESCRIPTION OF THE PREFERRED EMBODIMENTS

In the invention, a fuse element of a circular wire or a flat wire is used. The outer diameter or the thickness is set to 200 to 500 µm, preferably, 250 to 350 µm.

The fuse element in the invention has an alloy composition of 43%<weight of Sn≦70%, 0.5%≦weight of In≦10%, and the balance Bi (20 to 56.5%), preferably, 47%≦weight of Sn≦51%, 1.0%≦weight of In≦4%, and the balance Bi. The reference composition is 48% Sn, 2% In, and the balance Bi. The liquidus temperature is 152° C., the solidus temperature is 124° C., and the specific resistance is 34 µΩ·cm.

The above-mentioned weights of Sn (exceeding 43% and not larger than 70%), and Bi (20% or larger and 56.5% or smaller) cause the melting point to be in the vicinity of 175° C., and provide sufficient ductility required for drawing into a thin wire. The amount of In (0.5% or larger and 10% or smaller) sets the melting point to be in the solid-liquid coexisting region of 128 to 168° C. When the amount of In is larger than 10%, the ductility is so poor that drawing into a thin wire of 250 to 300 µmφ is hardly conducted because of the following reason. When In enters a mixture of a Bi phase (α phase) and which is almost insoluble in Sn and In and an Sn phase (γ phase), the α phase and an Sn—In intermetallic compound phase [δ phase . . . InSn, t phase. . . InSn$_4$] which are hard and brittle precipitate to increase the difference in mechanical characteristic between phases, thereby lowering the workability. When the amount of In is smaller than 0.5%, the insulation resistance and the dielectric breakdown characteristic after an operation of the thermal fuse which will be described later are hardly assured.

In the invention, 0.1 to 3.5 weight parts of one, or two or more elements selected from the group consisting of Ag, Au, Cu, Ni, Pd, Pt, Ga, Ge, and P are added to 100 weight parts of the alloy composition, in order to lower the specific resistance of the alloy, and also to miniaturize the crystal structure to reduce the interface between different phases in the alloy, thereby enabling work distortion and stress to be sufficiently dispersed. When smaller than 0.1 weight parts, satisfactory effects cannot be obtained, and, when larger than 3.5 weight parts, it is difficult to hold the liquidus temperature to about 170° C.

With respect to a drawing process, further enhanced strength and ductility are provided so that drawing into a thin wire of 250 to 300 µmφ can be conducted in a very simplified manner. It is known that a material to be bonded such as a metal material of the lead conductors, a thin-film material, or a particulate metal material in the film electrode migrates into the fuse element by solid phase diffusion. When the same element as the material to be bonded, such as Ag, Au, Cu, or Ni is previously added to the fuse element, the migration can be suppressed. Therefore, an influence of the material to be bonded which may originally affect the characteristics (for example, Ag, Au, or the like causes reduction or dispersion of the operating temperature due to the lowered melting point, and Cu, Ni, or the like causes dispersion of the operating temperature or an operation failure due to an increased intermetallic compound layer formed in the interface between different phases) is eliminated, and the thermal fuse can be assured to normally operate, without impairing the function of the fuse element.

The fuse element of the alloy type thermal fuse of the invention can be usually produced by a method in which a billet is produced, the billet is shaped into a stock wire by an extruder, and the stock wire is drawn by a dice to a wire. The outer diameter is 200 to 600 µmφ, preferably, 250 to 350 µmφ as described above. The wire can be finally passed through calender rolls so as to be used as a flat wire.

Alternatively, the fuse element may be produced by the rotary drum spinning method in which a cylinder containing cooling liquid is rotated, the cooling liquid is held in a layer-like manner by a rotational centrifugal force, and a molten material jet ejected from a nozzle is introduced into the cooling liquid layer to be cooled and solidified, thereby obtaining a thin wire member.

In the production, the alloy composition is allowed to contain inevitable impurities which are produced in productions of metals of raw materials and also in melting and stirring of the raw materials.

The invention may be implemented in the form of a thermal fuse serving as an independent thermo protector. Alternatively, the invention may be implemented in the form in which a thermal fuse element is connected in series to a semiconductor device, a capacitor, or a resistor, a flux is applied to the element, the flux-applied fuse element is placed in the vicinity of the semiconductor device, the capacitor, or the resistor, and the fuse element is sealed together with the semiconductor device, the capacitor, or the resistor by means of resin mold, a case, or the like.

Figure 1:
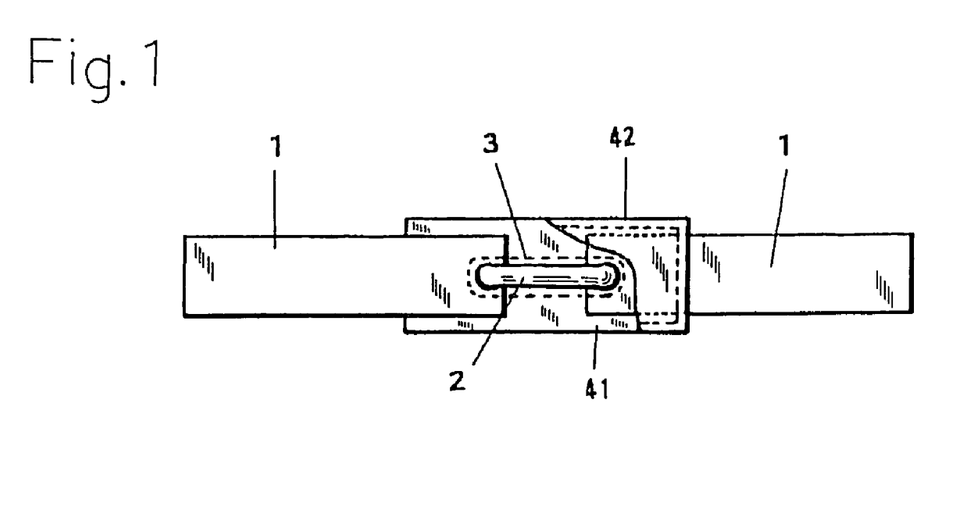
FIG. 1 is a view showing an example of the alloy type thermal fuse of the invention.

FIG. 1 shows an alloy type thermal fuse of the cylindrical case type according to the invention. A fuse element 2 made of a wire member for a thermal fuse element according to claim 1 or 2 is connected between a pair of lead conductors 1 by, for example, welding. A flux 3 is applied to the fuse element 2. The flux-applied fuse element is passed through an insulating tube 4 which is excellent in heat resistance and thermal conductivity, for example, a ceramic tube. Gaps between the ends of the insulating tube 4 and the lead conductors 1 are sealingly closed by a sealing agent 5 such as a cold-setting epoxy resin.

Figure 2:
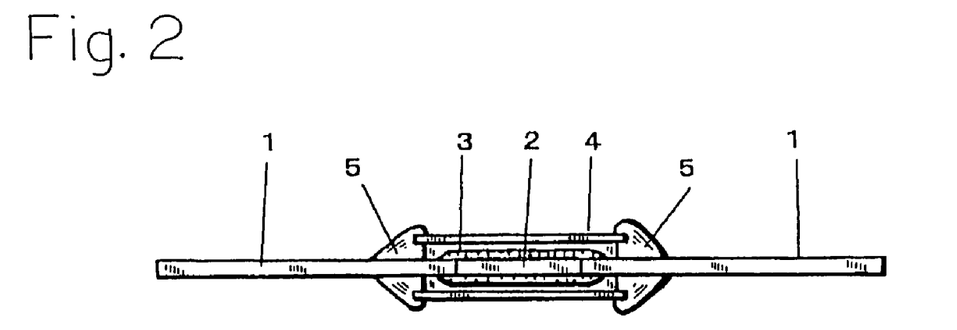
FIG. 2 is a view showing another example of the alloy type thermal fuse of the invention.

FIG. 2 shows a fuse of the radial case type. A fuse element 2 made of a wire member for a thermal fuse element according to claim 1 or 2 is connected between tip ends of parallel lead conductors 1 by, for example, welding. A flux 3 is applied to the fuse element 2. The flux-applied fuse element is enclosed by an insulating case 4 in which one end is opened, for example, a ceramic case. The opening of the insulating case 4 is sealingly closed by sealing agent 5 such as a cold-setting epoxy resin.

Figure 3:
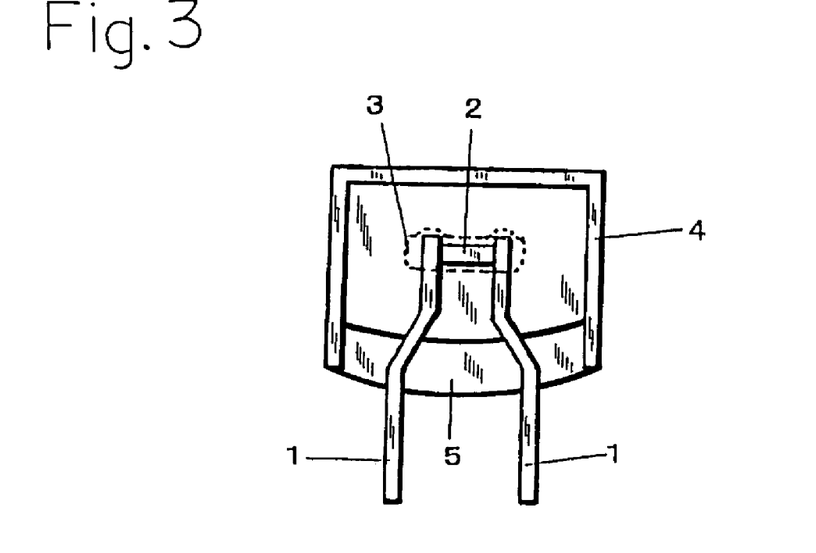
FIG. 3 is a view showing a further example of the alloy type thermal fuse of the invention.

FIG. 3 shows a tape-like fuse. In the fuse, strip lead conductors 1 having a thickness of 100 to 200 µm are fixed by, for example, an adhesive agent or fusion bonding to a plastic base film 41 having a thickness of 100 to 300 µm. A fuse element 2 made of a wire member for a thermal fuse element according to claim 1 or 2 having a diameter of 250 to 500 µmφ is connected between the strip lead conductors by, for example, welding. A flux 3 is applied to the fuse element 2. The flux-applied fuse element is sealed by means of fixation of a plastic cover film 42 having a thickness of 100 to 300 µm by, for example, an adhesive agent or fusion bonding.

Figure 4:
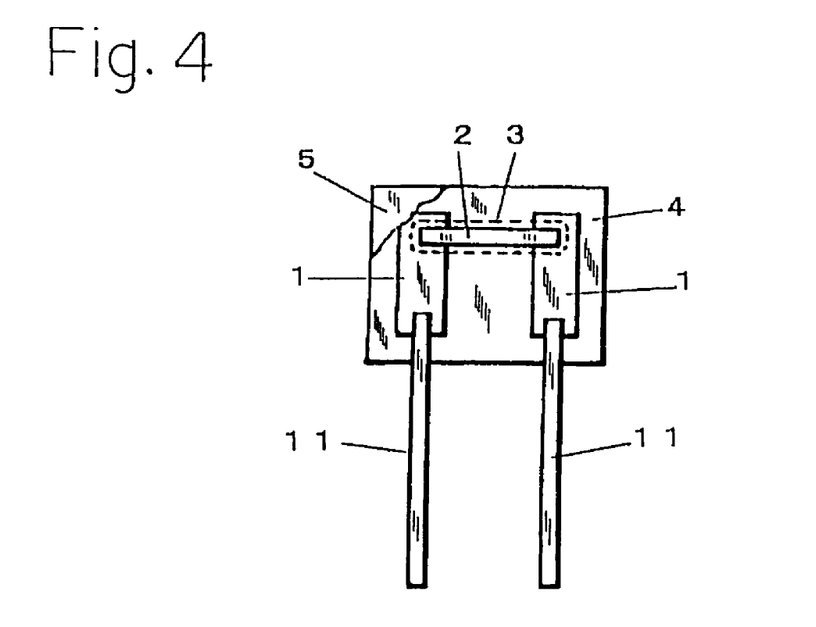
FIG. 4 is a view showing a still further example of the alloy type thermal fuse of the invention.

FIG. 4 shows a fuse of the radial resin dipping type. A fuse element 2 made of a wire member for a thermal fuse element according to claim 1 or 2 is bonded between tip ends of parallel lead conductors 1 by, for example, welding. A flux 3 is applied to the fuse element 2. The flux-applied fuse element is dipped into a resin solution to seal the element by an insulative sealing agent such as an epoxy resin 5.

Figure 5:
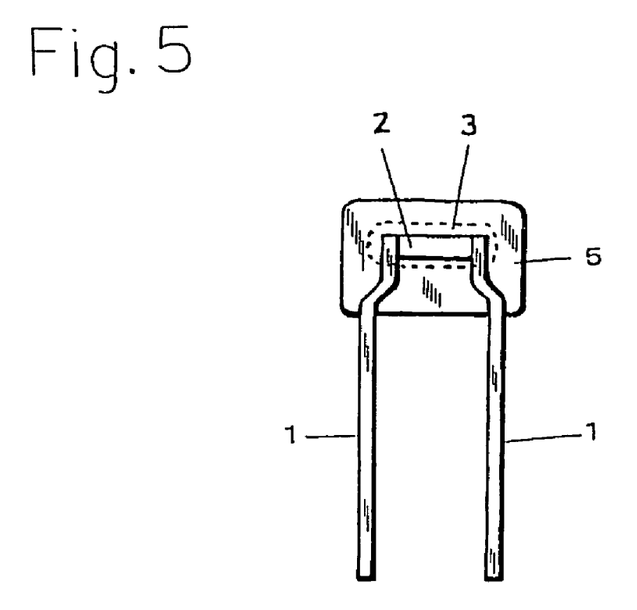
FIG. 5 is a view showing a still further example of the alloy type thermal fuse of the invention.

FIG. 5 shows a fuse of the substrate type. A pair of film electrodes 1 are formed on an insulating substrate 4 such as a ceramic substrate by printing conductive paste. Lead conductors 11 are connected respectively to the electrodes 1 by, for example, welding or soldering. A fuse element 2 made of a wire member for a thermal fuse element according to claim 1 or 2 is bonded between the electrodes 1 by, for example, welding. A flux 3 is applied to the fuse element 2. The flux-applied fuse element is covered with a sealing agent 5 such as an epoxy resin. The conductive paste contains metal particles and a binder. For example, Ag, Ag—Pd, Ag—Pt, Au, Ni, or Cu may be used as the metal particles, and a material containing a glass frit, a thermosetting resin, and the like may be used as the binder.

In the alloy type thermal fuses, in the case where Joule's heat of the fuse element is negligible, the temperature Tx of the fuse element when the temperature of the appliance to be protected reaches the allowable temperature Tm is lower than Tm by 2 to 3° C., and the melting point of the fuse element is usually set to [Tm−(2 to 3° C.)].

In the case where Joule's heat of the fuse element is nonnegligible, when the electrical resistance of the fuse element is R, the current flowing through the fuse element is I, and the thermal resistance between the appliance and the fuse element is H, the following expression holds:

$$Tx=Tm-(2 \text{ to } 3° \text{ C.})+HRI^2.$$

In the invention, the specific resistance is low, and R can be set to be sufficiently low. Even when the current is large, therefore, the melting point of the fuse element can be set to [Tm−(2 to 3° C.)], so that the capacity of the thermal fuse can be easily increased.

Figure 6:
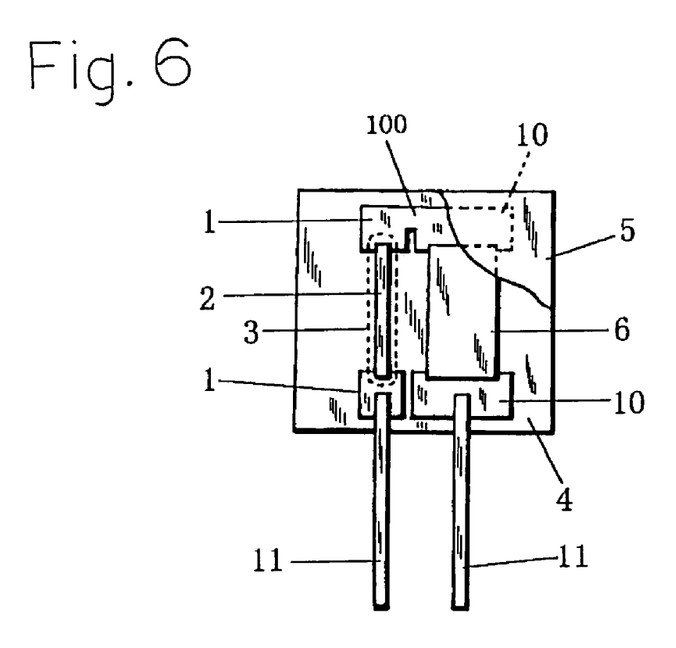
FIG. 6 is a view showing a still further example of the alloy type thermal fuse of the invention.

The invention may be implemented in the form in which a heating element for fusing off the fuse element is additionally disposed on the alloy type thermal fuse. As shown in FIG. 6, for example, a conductor pattern 100 having fuse element electrodes 1 and resistor electrodes 10 is formed on the insulating substrate 4 such as a ceramic substrate by printing conductive paste, and a film resistor 6 is disposed between the resistor electrodes 10 by applying and baking resistance paste (e.g., paste of metal oxide powder such as ruthenium oxide). A fuse element 2 made of a wire member for a thermal fuse element according to claim 1 or 2 is bonded between the electrodes 1 by, for example, welding. A flux 3 is applied to the fuse element 2. The flux-applied fuse element 2 and the film resistor 6 are covered with a sealing agent 5 such as an epoxy resin.

In the fuse having an electric heating element, a precursor causing abnormal heat generation of an appliance is detected, the film resistor is energized to generate heat in response to a signal indicative of the detection, and the fuse element is fused off by the heat generation.

The heating element may be disposed on the upper face of an insulating substrate. A heat-resistant and thermal-conductive insulating film such as a glass baked film is formed on the heating element. A pair of electrodes are disposed, flat lead conductors are connected respectively to the electrodes, and the fuse element is connected between the electrodes. A flux covers a range over the fuse element and the tip ends of the lead conductors. An insulating cover is placed on the insulating substrate, and the periphery of the insulating cover is sealingly bonded to the insulating substrate by an adhesive agent.

Among the alloy type thermal fuses, those of the type in which the fuse element is directly bonded to the lead conductors (FIGS. 1, 2, 3, and 4) may be configured in the following manner. At least portions of the lead conductors where the fuse element is bonded are covered with a thin film of Sn or Ag (having a thickness of, for example, 15 μm or smaller, preferably, 5 to 10 μm) (by plating or the like), thereby enhancing the bonding strength with respect to the fuse element.

In the alloy type thermal fuses, there is a possibility that a metal material or a thin film material in the lead conductors, or a particulate metal material in the film electrode migrates into the fuse element by solid phase diffusion. As described above, however, the characteristics of the fuse element can be sufficiently maintained by previously adding the same element as the thin film material into the fuse element.

As the flux, a flux having a melting point which is lower than that of the fuse element is generally used. For example, useful is a flux containing 90 to 60 weight parts of rosin, 10 to 40 weight parts of stearic acid, and 0 to 3 weight parts of an activating agent. In this case, as the rosin, a natural rosin, a modified rosin (for example, a hydrogenated rosin, an inhomogeneous rosin, or a polymerized rosin), or a purified rosin thereof can be used. As the activating agent, hydrochloride or hydrobromide of an amine such as diethylamine, or an organic acid such as adipic acid can be used.

As described above, the alloy type thermal fuse has the operation mechanism in which the fuse element is melted, and the molten alloy is divided because of the wettability with respect to the lead conductors or the film electrodes under the coexistence with the activated molten flux.

When the liquidus phase diagram of a ternary Sn—In—Bi alloy is obtained, a temperature zone having a desired liquidus temperature exists in the In poor side. According to results of intensive studies by the inventors, however, the followings were found. In a composition in the vicinity of a binary eutectic curve which elongates from the Bi—Sn eutectic toward the Bi—In—Sn ternary eutectic point (57% Bi, 26% In, 17% Sn) via the peritectic point of bout 41Sn-4In-55Bi, destruction easily occurs at an operation of a fuse in an overload test according to the nominal rating, and, even in an overload test according to a rating which is lowered so that destruction does not occur, the insulation resistance after an operation is fairly low, and the dielectric breakdown characteristic is considerably impaired.

The reason of the above was investigated, and the followings were confirmed. As described above, because of the narrow solid-liquid coexisting region, the alloy during energization and temperature rise is suddenly changed from the solid phase to the liquid phase, thereby causing an arc to be easily generated immediately after the operation. When an arc is generated, a local and sudden temperature rise occurs. As a result, the flux is vaporized to raise the internal pressure, or the flux is charred. In addition to the above, also the high surface tension causes the molten alloy or the charred flux to be intensely scattered as a result of energization. Therefore, physical destruction such as generation of cracks due to a local and sudden temperature rise, a rise of the internal pressure, or reconduction between charred flux portions easily occurs during an operation. Moreover, the insulation distance is shortened by the scattered alloy or the charred flux, so that dielectric breakdown is easily caused by reconduction when a voltage is applied after an operation.

By contrast, in a fuse element in the invention, the alloy composition is considerably separated from the abovementioned range of the vicinity of eutectic, the solid-liquid coexisting region is fairly wide, and the content of Bi having a higher surface tension is relatively small. Therefore, the fuse element is divided in a wide solid-liquid coexisting region even during energization and temperature rise (it has been confirmed that, in the alloy type thermal fuse of the invention, the fuse element is divided at a temperature which is lower than the liquidus temperature), and hence the occurrence of an arc immediately after an operation can be satisfactorily suppressed. This acts synergistically with the reduced surface tension due to the low content of Bi to prevent the above-mentioned physical destruction from occurring even in an overload test according to the nominal rating, so that the insulation resistance after an operation can be maintained to be sufficiently high and an excellent dielectric breakdown characteristic can be ensured.

In the thermal fuse of the invention, the temperature of the fuse element at an operation is lower than the liquidus temperature by 9° C. or more, and the operating temperature of the thermal fuse is lower than the liquidus temperature of the fuse element by 6° C. or more.

Figure 7:
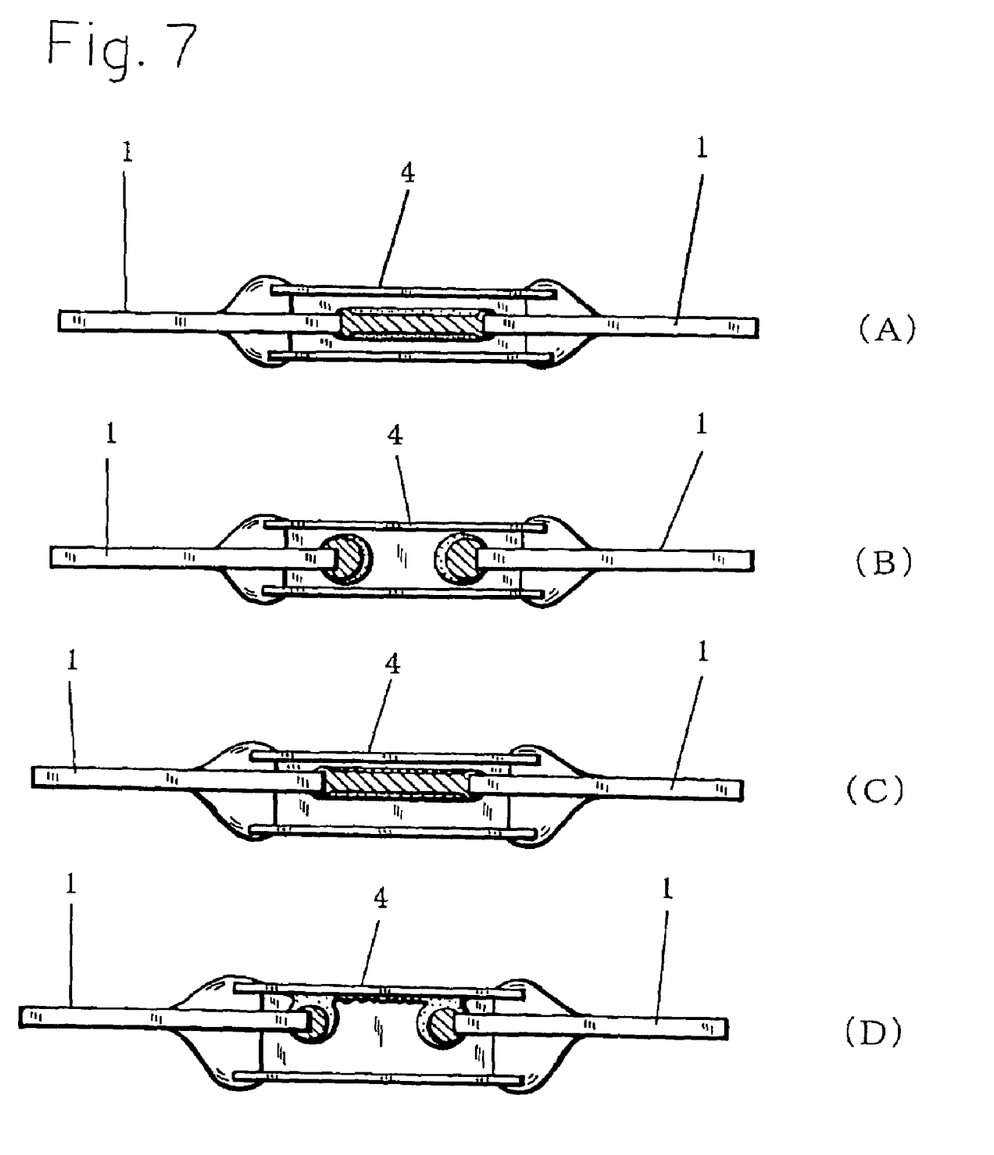
FIG. 7 is a view showing an alloy type thermal fuse of the cylindrical case type and its operation state.

Among the above-described alloy type thermal fuses, in the fuse of the cylindrical case type, the arrangement in which the lead conductors 1 are placed so as not to be eccentric to the cylindrical case 4 as shown in (A) of FIG. 7 is a precondition to enable the normal spheroid division shown in (B) of FIG. 7. When the lead conductors are eccentric as shown in (C) of FIG. 7, the flux (including a charred flux) and scattered alloy portions after an operation easily adhere to the inner wall of the cylindrical case. As a result, the insulation resistance is lowered, and the dielectric breakdown characteristic is impaired.

Figure 8:
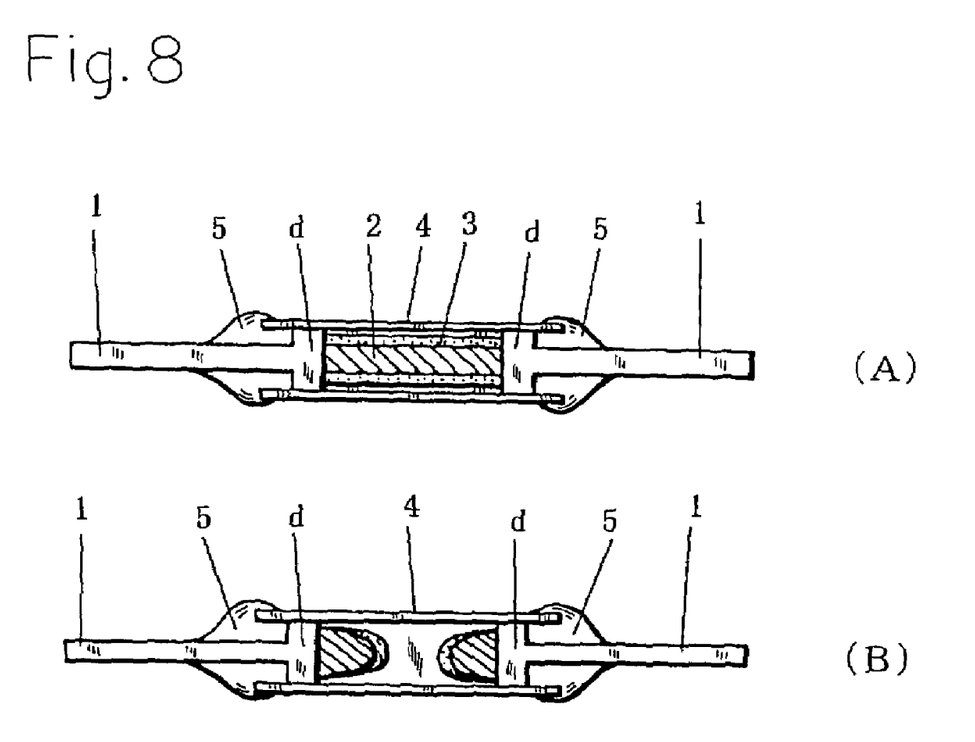
FIG. 8 is a view showing a still further example of the alloy type thermal fuse of the invention.

In order to prevent such disadvantages from being produced, as shown in (A) of FIG. 8, ends of the lead conductors 1 are formed into a disk-like shape d, and ends of the fuse element 2 are bonded to the front faces of the disks d, respectively (by, for example, welding). The outer peripheries of the disks are supported by the inner face of the cylindrical case. This is effective in positioning the fuse element 2 so as to be substantially concentrical with the cylindrical case 4 [in (A) of FIG. 8, 3 denotes a flux applied to the fuse element 2, 4 denotes the cylindrical case, 5 denotes a sealing agent such as an epoxy resin, and the outer diameter of each disk is approximately equal to the inner diameter of the cylindrical case]. In this instance, as shown in (B) of FIG. 8, molten portions of the fuse element spherically aggregate on the front faces of the disks d, thereby preventing the flux (including a charred flux) from adhering to the inner face of the case 4.

EXAMPLES

In the following examples and comparative examples, alloy type thermal fuses of the cylindrical case type having an AC rating of 2 A×250 V were used. The fuses have the following dimensions. The outer diameter of a cylindrical ceramic case is 2.5 mm, the thickness of the case is 0.5 mm, the length of the case is 9 mm, the outer diameter of a copper lead conductor is 0.6 mmφ, and the outer diameter and length of a fuse element are 0.6 mmφ and 3.5 mm, respectively. A compound of 80 weight parts of rosin, 20 weight parts of stearic acid, and 1 weight part of hydrobromide of diethylamine was used as the flux. A cold-setting epoxy resin was used as a sealing agent.

The insulation stability after an operation of a thermal fuse was evaluated on the basis of the overload test method defined in IEC 60691 (the humidity test before the overload test was omitted).

Specifically, existence of destruction at an operation was first tested while a voltage of 1.1×the rated voltage and a current of 1.5×the rated current were applied to a specimen, and the thermal fuse was caused to operate by raising the temperature at a rate of (2±1) K/min. Among specimens in which destruction did not occur, those in which the insulation between lead conductors withstood 2×the rated voltage (500 V) for 1 min., and that between the lead conductors and the outer face of the cylindrical case (wrapped by a metal foil) withstood 2×the rated voltage+1,000 V (1,500 V) for 1 min. were judged acceptable with respect to the dielectric breakdown characteristic, and those in which the insulation resistance between the lead conductors when a DC voltage of 2×the rated voltage (500 V) was applied was 0.2 MΩ or higher, and that between the lead conductors and the outer face of the cylindrical case (wrapped by a metal foil) was 2 MΩ or higher were judged acceptable with respect to the insulation resistance. Acceptance with respect to both the dielectric breakdown characteristic and the insulation resistance was set as the acceptance criterion for the insulation stability. When all of 50 specimens were accepted with respect to the insulation stability, the specimens were evaluated as ○, and, when even one of the specimens was not accepted, the specimens were evaluated as ×.

With respect to the operating temperature of a thermal fuse, 50 specimens were used. Each of the specimens was immersed into an oil bath in which the temperature was raised at a rate of 1° C./min., while supplying a current of 0.1 A to the specimen, and the temperature T0 of the oil when the current supply was interrupted by blowing-out of the fuse element was measured. A temperature of T0−2° C. was determined as the operating temperature of the thermal fuse.

The liquidus temperature of a fuse element was measured by a DSC [in which a reference specimen (unchanged) and a measurement specimen are housed in a nitrogen-filled vessel, an electric power is supplied to a heater of the vessel to heat the samples at a constant rate, and a variation of the heat energy input amount due to a thermal change of the measurement specimen is detected by a differential thermocouple].

With respect to the wire drawability of a fuse element, the draw-down ratio per dice was set to 6.5%, and the drawing speed was set to 45 m/min. A specimen which was able to be drawn into a wire of 300 μmφ was evaluated as ○, and that in which a breakage occurred and the continuity of the drawing process could not be ensured was evaluated as ×.

Example 1

In the example, alloy type thermal fuses of the cylindrical case type having a fuse element of a composition of 48% Sn, 2% In, and the balance Bi were used.

Although the thermal fuses were operated under the above-mentioned overload application, the fuses were able to be operated without causing a breakage. The insulation stability after an operation was as follows. The insulation between lead conductors withstood 2×the rated voltage (500 V) for 1 min. or longer, that between the lead conductors and the outer face of the cylindrical case withstood 2×the rated voltage+1,000 V (1,500 V) for 1 min. or longer, the insulation resistance between the lead conductors when a DC voltage of 2×the rated voltage (500 V) was applied was 0.2 MΩ or higher, and that between the lead conductors and the outer face of the cylindrical case was 2 MΩ or higher. As a result, the insulation stability was ◯.

The fuse element temperature at an operation of the thermal fuse is 135° C., and the liquidus temperature of the fuse element is 152° C. (the element temperature at an operation is lower than the liquidus temperature by 17° C.), so that the operating temperature is lower than the liquidus temperature. It is apparent that the fuse element is broken in the solid-liquid coexisting region.

The reason why the insulation stability after an operation is ◯ (an excellent dielectric breakdown characteristic and a high insulation resistance) without causing a breakage during the operation under the overload application is estimated as follows. The division of the fuse element is performed in the wide solid-liquid coexisting region. Therefore, the occurrence of an arc immediately after an operation is very seldom, and a local and sudden temperature rise hardly occurs. Consequently, pressure rise by vaporization of the flux and charring of the flux due to the temperature rise can be suppressed, and physical destruction does not occur. This acts synergistically with the reduced surface tension to sufficiently suppress scattering and the like of molten alloy or charred flux due to an energizing operation, whereby a sufficient insulation distance can be ensured.

The specific resistance of the fuse element is as low as 34 μΩ·cm. Even under a high load current, therefore, self-heating can be sufficiently suppressed so that the thermal fuse can operate at a predetermined temperature.

Also the drawability of the fuse element is ◯.

Examples 2 to 5

The examples were conducted in the same manner as Example 1 except that the amount of Sn in Example 1 was changed as listed in Table 1 and, in accordance with the change, the amount of Bi was changed.

In all the examples, in the same manner as Example 1, even when the thermal fuses were operated under the abovementioned overload application, no breakage occurred, and the insulation stability after an overload operation was ◯.

In all the examples, the element temperature at an operation is lower than the liquidus temperature (by 11 to 13° C.), and it is apparent that the fuse element is broken in the solid-liquid coexisting region. The reason why the insulation stability after an operation is ◯ without causing a breakage during the operation under the overload application is estimated as follows. In the same manner as described above, the division of the fuse element is performed in the wide solid-liquid coexisting region. Therefore, the occurrence of an arc immediately after an operation is very seldom, and a local and sudden temperature rise hardly occurs. Consequently, pressure rise by vaporization of the flux and charring of the flux due to the temperature rise can be suppressed, and physical destruction does not occur. This acts synergistically with the reduced surface tension to sufficiently suppress scattering and the like of molten alloy or charred flux due to an energizing operation, whereby a sufficient insulation distance can be ensured.

In all the examples, the specific resistance of the fuse element is low, and, even under a high load current, self-heating can be sufficiently suppressed so that the thermal fuse can operate at a predetermined temperature.

Also the drawability of the fuse element in all the examples was ◯.

TABLE 1

| | Ex. 2 | Ex. 3 | Ex. 4 | Ex. 5 |
|---|---|---|---|---|
| Sn (%) | 44 | 53 | 62 | 70 |
| In (%) | 2 | 2 | 2 | 2 |
| Bi (%) | Balance | Balance | Balance | Balance |
| Destruction at operation | None | None | None | None |
| Insulation stability after operation | ◯ | ◯ | ◯ | ◯ |
| Liquidus temperature (° C.) | 144 | 156 | 167 | 178 |
| Element temperature at operation (° C.) | 132 ± 1 | 143 ± 2 | 152 ± 3 | 162 ± 3 |
| Specific resistance (μΩ · cm) | 36 | 31 | 27 | 23 |
| Drawability | ◯ | ◯ | ◯ | ◯ |

Examples 6 to 9

The examples were conducted in the same manner as Example 1 except that the composition of the fuse element in Example 1 was changed as listed in Table 2.

In all the examples, in the same manner as Example 1, even when the thermal fuses were operated under the overload application, no breakage occurred, and the insulation stability after an overload operation was ◯.

In all the examples, the element temperature at an operation is lower than the liquidus temperature (by 10 to 12° C.), and it is apparent that the fuse element is broken in the solid-liquid coexisting region. The reason why the insulation stability after an operation is ◯ is identical with that described above.

In all the examples, the specific resistance of the fuse element is low, and, even under a high load current, self-heating can be sufficiently suppressed so that the thermal fuse can operate at a predetermined temperature.

Also the drawability of the fuse element in all the examples is ◯.

TABLE 2

| | Ex. 6 | Ex. 7 | Ex. 8 | Ex. 9 |
|---|---|---|---|---|
| Sn (%) | 44 | 52 | 61 | 70 |
| In (%) | 0.5 | 0.5 | 0.5 | 0.5 |
| Bi (%) | Balance | Balance | Balance | Balance |
| Destruction at operation | None | None | None | None |
| Insulation stability after operation | ◯ | ◯ | ◯ | ◯ |
| Liquidus temperature (° C.) | 142 | 154 | 164 | 176 |
| Element temperature at operation (° C.) | 131 ± 1 | 142 ± 2 | 150 ± 3 | 161 ± 3 |
| Specific resistance (μΩ · cm) | 37 | 32 | 28 | 24 |
| Drawability | ◯ | ◯ | ◯ | ◯ |

Examples 10 to 13

The examples were conducted in the same manner as Example 1 except that the composition of the fuse element in Example 1 was changed as listed in Table 3.

In all the examples, in the same manner as Example 1, even when the examples were operated under the overload application, no breakage occurred, and the insulation stability after an overload operation was ○.

In all the examples, the element temperature at an operation is lower than the liquidus temperature (by 10 to 13° C.), and it is apparent that the fuse element is broken in the solid-liquid coexisting region. The reason why the insulation stability after an operation is ○ is identical with that described above.

In all the examples, the specific resistance of the fuse element is low, and, even under a high load current, self-heating can be sufficiently suppressed so that the thermal fuse can operate at a predetermined temperature.

Also the drawability of the fuse element in all the examples is ○.

TABLE 3

|  | Ex. 10 | Ex. 11 | Ex. 12 | Ex. 13 |
| --- | --- | --- | --- | --- |
| Sn (%) | 44 | 52 | 61 | 70 |
| In (%) | 3 | 3 | 3 | 3 |
| Bi (%) | Balance | Balance | Balance | Balance |
| Destruction at operation | None | None | None | None |
| Insulation stability after operation | ○ | ○ | ○ | ○ |
| Liquidus temperature (° C.) | 146 | 158 | 168 | 180 |
| Element temperature at operation (° C.) | 134 ± 2 | 145 ± 2 | 153 ± 3 | 164 ± 3 |
| Specific resistance ($\mu\Omega \cdot cm$) | 35 | 30 | 27 | 23 |
| Drawability | ○ | ○ | ○ | ○ |

Examples 14 to 17

The examples were conducted in the same manner as Example 1 except that the composition of the fuse element in Example 1 was changed as listed in Table 4.

In all the examples, in the same manner as Example 1, even when the examples were operated under the overload application, no breakage occurred, and the insulation stability after an overload operation was ○.

In all the examples, the element temperature at an operation is lower than the liquidus temperature (by 11 to 14° C.), and it is apparent that the fuse element is broken in the solid-liquid coexisting region. The reason why the insulation stability after an operation is ○ is identical with that described above.

TABLE 4

|  | Ex. 14 | Ex. 15 | Ex. 16 | Ex. 17 |
| --- | --- | --- | --- | --- |
| Sn (%) | 44 | 52 | 61 | 70 |
| In (%) | 6 | 6 | 6 | 6 |
| Bi (%) | Balance | Balance | Balance | Balance |
| Destruction at operation | None | None | None | None |
| Insulation stability after operation | ○ | ○ | ○ | ○ |
| Liquidus temperature (° C.) | 149 | 161 | 170 | 182 |
| Element temperature at operation (° C.) | 136 ± 2 | 147 ± 2 | 155 ± 3 | 165 ± 3 |
| Specific resistance ($\mu\Omega \cdot cm$) | 33 | 29 | 25 | 21 |
| Drawability | ○ | ○ | ○ | ○ |

Examples 18 to 21

The examples were conducted in the same manner as Example 1 except that the composition of the fuse element in Example 1 was changed as listed in Table 5.

In all the examples, in the same manner as Example 1, even when the examples were operated under the overload application, no breakage occurred, and the insulation stability after an overload operation was ○.

In all the examples, the element temperature at an operation is lower than the liquidus temperature (by 11 to 13° C.), and it is apparent that the fuse element is broken in the solid-liquid coexisting region. The reason why the insulation stability after an operation is ○ is identical with that described above.

In all the examples, the specific resistance of the fuse element is low, and, even under a high load current, self-heating can be sufficiently suppressed so that the thermal fuse can operate at a predetermined temperature. Also the drawability of the fuse element in all the examples is ○.

TABLE 5

|  | Ex. 18 | Ex. 19 | Ex. 20 | Ex. 21 |
| --- | --- | --- | --- | --- |
| Sn (%) | 44 | 52 | 61 | 70 |
| In (%) | 10 | 10 | 10 | 10 |
| Bi (%) | Balance | Balance | Balance | Balance |
| Destruction at operation | None | None | None | None |
| Insulation stability after operation | ○ | ○ | ○ | ○ |
| Liquidus temperature (° C.) | 148 | 160 | 169 | 180 |
| Element temperature at operation (° C.) | 135 ± 2 | 146 ± 2 | 154 ± 3 | 164 ± 3 |
| Specific resistance ($\mu\Omega \cdot cm$) | 32 | 27 | 23 | 20 |
| Drawability | ○ | ○ | ○ | ○ |

Example 22

An alloy composition in which 1 weight part of Ag was added to 100 weight parts of 48% Sn, 2% In, and the balance Bi was used. A wire member for a fuse element of 300 μmφ was produced under conditions in which the draw-down ratio per dice was 8% and the drawing speed was 60 m/min., and which are severer than those of the drawing process of a wire member for a fuse element in Example 1. However, no wire breakage occurred. The specific resistance was lower than that in Example 1.

In the example, in the same manner as Example 1, even when the thermal fuse was operated under the overload application, no breakage occurred, and the insulation stability after an overload operation was ○. The element temperature at an operation and the liquidus temperature are substantially equal to those of Example 1. Namely, the element temperature at an operation is lower than the liquidus temperature, and it is apparent that the fuse element is broken in the solid-liquid coexisting region. The reason of this is identical with that described above.

It was confirmed that the above-mentioned effects are obtained in the range of the addition amount of 0.1 to 3.5 weight parts of Ag.

Examples 23 to 30

Alloy compositions in which 0.5 weight parts of respective one of Au, Cu, Ni, Pd, Pt, Ga, Ge, and P were added to 100 weight parts of 48% Sn, 2% In, and the balance Bi were used. A wire member for a fuse element of 300 µmφ was produced under conditions in which the draw-down ratio per dice was 8% and the drawing speed was 60 m/min., and which are severer than those of the production of a wire member for a fuse element in Example 1. However, no wire breakage occurred.

In the examples, in the same manner as Example 1, even when the thermal fuses were operated under the abovementioned overload application, no breakage occurred, and the insulation stability after an overload operation was ○. The element temperature at an operation and the liquidus temperature are substantially equal to those of Example 1. Namely, the element temperature at an operation is lower than the liquidus temperature, and it is apparent that the fuse element is broken in the solid-liquid coexisting region. The reason of this is identical with that described above.

It was confirmed that the above-mentioned effects are obtained in the range of the addition amount of 0.1 to 3.5 weight parts of each of Au, Cu, Ni, Pd, Pt, Ga, Ge, and P.

Comparative Example 1

The comparative example was conducted in the same manner as Example 1 except that the composition of the fuse element in Example 1 was changed to 41% Sn, 4% In, and 55% Bi.

When the comparative example was operated under the above-mentioned overload application, a breakage occurred. The reason of this is estimated as follows. Since the solid-liquid coexisting region is narrow, the alloy during energization is suddenly changed from the solid phase to the liquid phase, and an arc is generated immediately after an operation, so that a local and sudden temperature rise occurs. Therefore, a rise of the internal pressure due to vaporization of the flux or charring of the flux occurs. As a result, physical destruction is caused by the temperature rise, the rise of the internal pressure, or reconduction between charred flux portions.

Comparative Example 2

The comparative example was conducted in the same manner as Example 1 except that the composition of the fuse element in Example 1 was changed to 52% Sn and 48% Bi.

Even when the comparative example was operated under the above-mentioned overload application, no breakage occurred. However, the insulation resistance between the lead conductors after an operation is as low as 0.1 MΩ or lower. When a voltage of 2×the rated voltage (500 V) was applied, reconduction often occurred. Therefore, the insulation stability was ×. The reason of this is estimated as follows. Although the fuse element is broken in the solid-liquid coexisting region, the region is relatively narrow, and hence the alloy during energization is relatively rapidly changed from the solid phase to the liquid phase, thereby causing an arc to be generated immediately after an operation. As a result, the flux is easily charred by a local and sudden temperature rise. Also the high surface tension of the binary Bi—Sn alloy causes the molten alloy or the charred flux to be intensely scattered as a result of an energizing operation. Therefore, the insulation distance is shortened by the scattered alloy or the charred flux, and hence the insulation resistance after an operation is relatively low. As a result, when a voltage is applied, reconduction occurs to cause dielectric breakdown.

Comparative Example 3

The comparative example was conducted in the same manner as Example 1 except that the composition of the fuse element in Example 1 was changed to 40% Sn, 0.5% In, and the balance Bi.

Even when the comparative example was operated under the above-mentioned overload application, no breakage occurred. In the same manner as Comparative Example 2, however, the insulation stability was ×. The reason of this is identical with that of Comparative Example 2.

Comparative Example 4

The comparative example was conducted in the same manner as Example 1 except that the composition of the fuse element in Example 1 was changed to 72% Sn, 0.5% In, and the balance Bi.

The operating temperature is higher than 170° C. Therefore, the requirement that the operating temperature is 130 to 170° C. cannot be satisfied.

What is claimed is:

1. A wire member for a thermal fuse element wherein said wire element has an alloy composition in which Sn is larger than 43% and 70% or smaller, In is 0.5% or higher and 10% or lower, and a balance is Bi.

2. A wire member for a thermal fuse element wherein 0.1 to 3.5 weight parts of one, or two or more metals selected from the group consisting of Ag, Au, Cu, Ni, Pd, Pt, Ga, Ge, and P are added to 100 weight parts of a composition in which Sn is larger than 43% and 70% or smaller, In is 0.5% or higher and 10% or lower, and a balance is Bi.

3. An alloy type thermal fuse wherein a wire member for a thermal fuse element according to claim 1 is used as a fuse element.

4. An alloy type thermal fuse wherein a wire member for a thermal fuse element according to claim 2 is used as a fuse element.

5. An alloy type thermal fuse according to claim 3, wherein said fuse element contains inevitable impurities.

6. An alloy type thermal fuse according to claim 4, wherein said fuse element contains inevitable impurities.

7. An alloy type thermal fuse according to claim 3, wherein said thermal fuse has a configuration in which said fuse element is connected between lead conductors, and at least a portion of each of said lead conductors which is bonded to said fuse element is covered with an Sn or Ag film.

8. An alloy type thermal fuse according to claim 4, wherein said thermal fuse has a configuration in which said fuse element is connected between lead conductors, and at least a portion of each of said lead conductors which is bonded to said fuse element is covered with an Sn or Ag film.

9. An alloy type thermal fuse according to claim 5, wherein said thermal fuse has a configuration in which said fuse element is connected between lead conductors, and at least a portion of each of said lead conductors which is bonded to said fuse element is covered with an Sn or Ag film.

10. An alloy type thermal fuse according to claim 6, wherein said thermal fuse has a configuration in which said fuse element is connected between lead conductors, and at least a portion of each of said lead conductors which is bonded to said fuse element is covered with an Sn or Ag film.

11. An alloy type thermal fuse according to claim 3, wherein said thermal fuse has a configuration in which lead conductors are bonded to ends of said fuse element, respectively, a flux is applied to said fuse element, said flux-applied fuse element is passed through a cylindrical case, and gaps between ends of said cylindrical case and said lead conductors are sealingly closed, ends of said lead conductors have a disk-like shape, and ends of said fuse element are bonded to front faces of said disk.

12. An alloy type thermal fuse according to claim 4, wherein said thermal fuse has a configuration in which lead conductors are bonded to ends of said fuse element, respectively, a flux is applied to said fuse element, said flux-applied fuse element is passed through a cylindrical case, and gaps between ends of said cylindrical case and said lead conductors are sealingly closed, ends of said lead conductors have a disk-like shape, and ends of said fuse element are bonded to front faces of said disk.

13. An alloy type thermal fuse according to claim 5, wherein said thermal fuse has a configuration in which lead conductors are bonded to ends of said fuse element, respectively, a flux is applied to said fuse element, said flux-applied fuse element is passed through a cylindrical case, and gaps between ends of said cylindrical case and said lead conductors are sealingly closed, ends of said lead conductors have a disk-like shape, and ends of said fuse element are bonded to front faces of said disk.

14. An alloy type thermal fuse according to claim 6, wherein said thermal fuse has a configuration in which lead conductors are bonded to ends of said fuse element, respectively, a flux is applied to said fuse element, said flux-applied fuse element is passed through a cylindrical case, and gaps between ends of said cylindrical case and said lead conductors are sealingly closed, ends of said lead conductors have a disk-like shape, and ends of said fuse element are bonded to front faces of said disk.

15. An alloy type thermal fuse according to claim 7, wherein said thermal fuse has a configuration in which lead conductors are bonded to ends of said fuse element, respectively, a flux is applied to said fuse element, said flux-applied fuse element is passed through a cylindrical case, and gaps between ends of said cylindrical case and said lead conductors are sealingly closed, ends of said lead conductors have a disk-like shape, and ends of said fuse element are bonded to front faces of said disk.

16. An alloy type thermal fuse according to claim 8, wherein said thermal fuse has a configuration in which lead conductors are bonded to ends of said fuse element, respectively, a flux is applied to said fuse element, said flux-applied fuse element is passed through a cylindrical case, and gaps between ends of said cylindrical case and said lead conductors are sealingly closed, ends of said lead conductors have a disk-like shape, and ends of said fuse element are bonded to front faces of said disk.

17. An alloy type thermal fuse according to claim 9, wherein said thermal fuse has a configuration in which lead conductors are bonded to ends of said fuse element, respectively, a flux is applied to said fuse element, said flux-applied fuse element is passed through a cylindrical case, and gaps between ends of said cylindrical case and said lead conductors are sealingly closed, ends of said lead conductors have a disk-like shape, and ends of said fuse element are bonded to front faces of said disk.

18. An alloy type thermal fuse according to claim 10, wherein said thermal fuse has a configuration in which lead conductors are bonded to ends of said fuse element, respectively, a flux is applied to said fuse element, said flux-applied fuse element is passed through a cylindrical case, and gaps between ends of said cylindrical case and said lead conductors are sealingly closed, ends of said lead conductors have a disk-like shape, and ends of said fuse element are bonded to front faces of said disk.

19. An alloy type thermal fuse according to claim 3, wherein said thermal fuse has a configuration in which a pair of film electrodes are formed on a substrate by printing conductive paste containing metal particles and a binder, and said fuse element is connected between said film electrodes, and said metal particles are made of a material selected from the group consisting of Ag, Ag—Pd, Ag—Pt, Au, Ni, and Cu.

20. An alloy type thermal fuse according to claim 4, wherein said thermal fuse has a configuration in which a pair of film electrodes are formed on a substrate by printing conductive paste containing metal particles and a binder, and said fuse element is connected between said film electrodes, and said metal particles are made of a material selected from the group consisting of Ag, Ag—Pd, Ag—Pt, Au, Ni, and Cu.

21. An alloy type thermal fuse according to claim 5, wherein said thermal fuse has a configuration in which a pair of film electrodes are formed on a substrate by printing conductive paste containing metal particles and a binder, and said fuse element is connected between said film electrodes, and said metal particles are made of a material selected from the group consisting of Ag, Ag—Pd, Ag—Pt, Au, Ni, and Cu.

22. An alloy type thermal fuse according to claim 6, wherein said thermal fuse has a configuration in which a pair of film electrodes are formed on a substrate by printing conductive paste containing metal particles and a binder, and said fuse element is connected between said film electrodes, and said metal particles are made of a material selected from the group consisting of Ag, Ag—Pd, Ag—Pt, Au, Ni, and Cu.

23. An alloy type thermal fuse according to claim 3, wherein a heating element for fusing off said fuse element is additionally disposed.

24. An alloy type thermal fuse according to claim 4, wherein a heating element for fusing off said fuse element is additionally disposed.

25. An alloy type thermal fuse according to claim 5, wherein a heating element for fusing off said fuse element is additionally disposed.

26. An alloy type thermal fuse according to claim 6, wherein a heating element for fusing off said fuse element is additionally disposed.

27. An alloy type thermal fuse according to claim 7, wherein a heating element for fusing off said fuse element is additionally disposed.

28. An alloy type thermal fuse according to claim 8, wherein a heating element for fusing off said fuse element is additionally disposed.

29. An alloy type thermal fuse according to claim 9, wherein a heating element for fusing off said fuse element is additionally disposed.

30. An alloy type thermal fuse according to claim 10, wherein a heating element for fusing off said fuse element is additionally disposed.

31. An alloy type thermal fuse according to claim 11, wherein a heating element for fusing off said fuse element is additionally disposed.

32. An alloy type thermal fuse according to claim 12, wherein a heating element for fusing off said fuse element is additionally disposed.

33. An alloy type thermal fuse according to claim 13, wherein a heating element for fusing off said fuse element is additionally disposed.

34. An alloy type thermal fuse according to claim 14, wherein a heating element for fusing off said fuse element is additionally disposed.

35. An alloy type thermal fuse according to claim 15, wherein a heating element for fusing off said fuse element is additionally disposed.

36. An alloy type thermal fuse according to claim 16, wherein a heating element for fusing off said fuse element is additionally disposed.

37. An alloy type thermal fuse according to claim 17, wherein a heating element for fusing off said fuse element is additionally disposed.

38. An alloy type thermal fuse according to claim 18, wherein a heating element for fusing off said fuse element is additionally disposed.

39. An alloy type thermal fuse according to claim 19, wherein a heating element for fusing off said fuse element is additionally disposed.

40. An alloy type thermal fuse according to claim 20, wherein a heating element for fusing off said fuse element is additionally disposed.

41. An alloy type thermal fuse according to claim 21, wherein a heating element for fusing off said fuse element is additionally disposed.

42. An alloy type thermal fuse according to claim 22, wherein a heating element for fusing off said fuse element is additionally disposed.

43. An alloy type thermal fuse wherein a wire member according to claim 1 is used as a fuse element and wherein temperature of the fuse element at an operation is lower than a liquidus temperature of said fuse element by 9° C. or more.

44. An alloy type thermal fuse wherein a wire member according to claim 1 is used as a fuse element and wherein an operating temperature belongs to a range of 130 to 170° C., and is lower than a liquidus temperature of the fuse element by 6° C. or more.

* * * * *